US012670161B2

(12) United States Patent　　　　(10) Patent No.:　US 12,670,161 B2
Schole et al.　　　　　　　　　　　　(45) Date of Patent:　Jun. 30, 2026

(54) SYSTEMS AND METHODS FOR DELTA PROCESSING OF QUERIES IN A DATA FLOW PIPELINE

(71) Applicant: SAP SE, Walldorf (DE)

(72) Inventors: Jan Schole, St. Leon-Rot (DE); Christian Muenkel, Neulußheim (DE); Maxim Scholl, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/897,574

(22) Filed: Sep. 26, 2024

(65) Prior Publication Data

US 2026/0079941 A1　　Mar. 19, 2026

Related U.S. Application Data

(60) Provisional application No. 63/696,287, filed on Sep. 18, 2024.

(51) Int. Cl.
*G06F 16/00*　　　(2019.01)
*G06F 16/2453*　　(2019.01)
*G06F 16/2455*　　(2019.01)

(52) U.S. Cl.
CPC .. *G06F 16/24545* (2019.01); *G06F 16/24556* (2019.01); *G06F 16/24561* (2019.01)

(58) Field of Classification Search
CPC ......... G06F 16/24545; G06F 16/24556; G06F 16/24561
See application file for complete search history.

(56) References Cited

U.S. PATENT DOCUMENTS

| | | | |
|---|---|---|---|
| 11,755,568 B1 * | 9/2023 | Akidau | G06F 16/24539 |
| | | | 707/717 |
| 2003/0126143 A1 * | 7/2003 | Roussopoulos | G06F 16/283 |
| 2015/0120605 A1 * | 4/2015 | Xu | G06Q 10/063 |
| | | | 705/342 |
| 2018/0075100 A1 * | 3/2018 | Park | G06F 16/9024 |
| 2018/0113841 A1 * | 4/2018 | Pittman | G06F 7/48 |
| 2021/0064617 A1 * | 3/2021 | Finlay | G06F 16/24542 |

(Continued)

OTHER PUBLICATIONS

Buneman, P et al. On Propagation of Deletions and Annotations Through Views. ACM PODS [online], Jun. 2002 [retrieved on Jul. 21, 2025]. Retrieved from the Internet:< URL: https://dl.acm.org/doi/10.1145/543613.543633> (Year: 2002).*

(Continued)

*Primary Examiner* — Syed H Hasan
(74) *Attorney, Agent, or Firm* — Fountainhead Law Group, PC

(57)　　　　　　ABSTRACT

Embodiments of the present disclosure include techniques for processing analytic data using delta processing. In one embodiment, result data is generated from source data using a data pipeline and calculation plans. The result data may be modified and the plan may be re-executed to produce the modified result data. A reduced calculation plan is generated including only a portion of the original calculation plan to reduce the computational resources needed to execute the data processing. In some embodiments, data cached by operations in the pipeline are reused so the entire pipeline does not require re-execution to produce the modified result data.

20 Claims, 8 Drawing Sheets

(56) References Cited

U.S. PATENT DOCUMENTS

2021/0165789 A1* 6/2021 Deshpande ............. G06F 16/21
2021/0374146 A1* 12/2021 Hrastnik ........... G06F 16/24573

OTHER PUBLICATIONS

Keller, A M. Algorithms for translating view updates to database updates for views involving selections, projections, and joins. ACM SIGACT-SIGMOD [online], Mar. 1985 [retrieved on Jul. 21, 2025]. Retrieved from the Internet:< URL: https://dl.acm.org/doi/10.1145/325405.325423> (Year: 1985).*
Foster, J. N. Bidirectional Programming Languages. PhD Dissertation, University of Pennsylvania [online], Dec. 2009 [retrieved on Jul. 19, 2025]. Retrieved from the Internet:< URL:https://repository.upenn.edu/bitstreams/d4a1677c-c53d-46b7-9e2e-9f06e41ad682/download> (Year: 2009).*

* cited by examiner

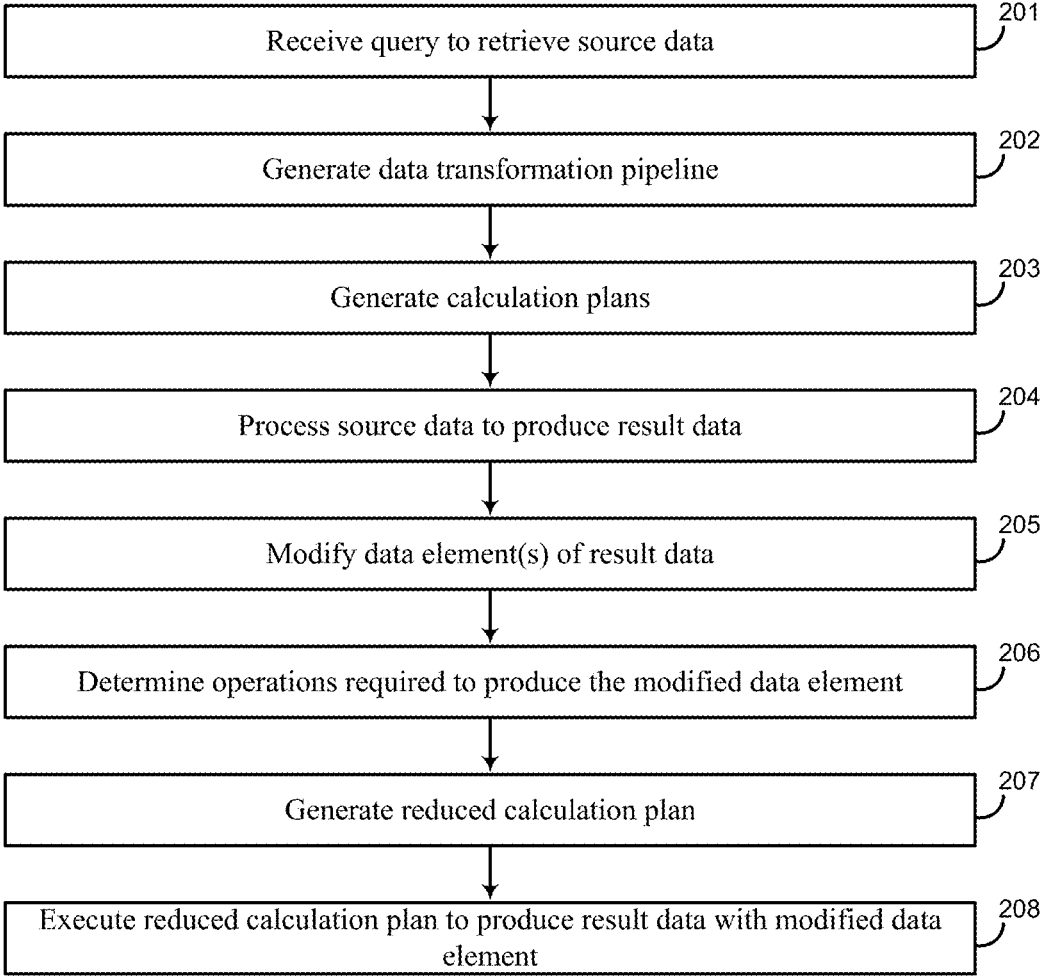

Receive query to retrieve source data — 201

Generate data transformation pipeline — 202

Generate calculation plans — 203

Process source data to produce result data — 204

Modify data element(s) of result data — 205

Determine operations required to produce the modified data element — 206

Generate reduced calculation plan — 207

Execute reduced calculation plan to produce result data with modified data element — 208

*Fig. 2*

| Department | DepartmentA | | DepartmentB | |
|---|---|---|---|---|
| Version | Plan | | Plan | |
| Measures | Budget | Income | Budget | Income |
| Date | | | | |
| ⌄ 2024 | 35.90 | 56.54 | 12.70 | 23.66 |
| › Q1 (2024) | 9.00 | 13.80 | 3.00 | 5.73 |
| › Q2 (2024) | 9.00 | 13.80 | 3.00 | 5.89 |
| › Q3 (2024) | 9.00 | 13.90 | 3.00 | 5.66 |
| ⌄ Q4 (2024) | 8.90 | 15.04 | 3.70 | 6.62 |
| Oct (2024) | 3.30 | 4.70 | 1.20 | 2.00 |
| Nov (2024) | 3.10 | 5.96 | 1.40 | 2.20 |
| Dec (2024) | 2.50 | 5.28 | 1.10 | 2.42 |

Fig. 3A

| Department | DepartmentA | | DepartmentB | |
|---|---|---|---|---|
| Version | Plan | | Plan | |
| Measures | Budget | Income | Budget | Income |
| Date | | | | |
| ⌄ 2024 | 35.90 | 56.54 | 12.70 | 23.66 |
| › Q1 (2024) | 9.00 | 13.80 | 3.00 | 5.73 |
| › Q2 (2024) | 9.00 | 13.80 | 3.00 | 5.89 |
| › Q3 (2024) | 9.00 | 13.90 | 3.00 | 5.66 |
| ⌄ Q4 (2024) | 10 Million   <u>301</u> | 15.04 | 3.70 | 6.62 |
| Oct (2024) | 3.30 | 4.70 | 1.20 | 2.00 |
| Nov (2024) | 3.10 | 5.96 | 1.40 | 2.20 |
| Dec (2024) | 2.50 | 5.28 | 1.10 | 2.42 |

Fig. 3B

SYSTEMS AND METHODS FOR DELTA PROCESSING OF QUERIES IN A DATA FLOW PIPELINE

CROSS REFERENCE TO RELATED APPLICATIONS

This application claims priority to U.S. Provisional Patent Application Ser. No. 63/696,287, filed on Sep. 18, 2024, the disclosure of which is hereby incorporated herein by reference.

BACKGROUND

The present disclosure relates generally to computer software systems, and in particular, to systems and methods for delta processing of queries in a data flow pipeline.

Data analysis applications use queries to load data for tables, charts and other widgets from a data source into a data sink (or target). For example, some data repositories (e.g., data warehouses) may store data using data cubes. A query may retrieve data from a data cube, and the query may include a number of processing steps performed on the stored data. However, when a table definition or the underlying data changes in the data target, a query must be sent again to re-calculate the results. When only parts of the table definition or underlying data change, some of the calculated results don't change at all. Unfortunately, the dependencies of the calculations and the relation between displayed results and the persisted source data are quite complex in general.

The present disclosure includes techniques to re-calculate only parts of a data flow that might have changed. This reduces the workload on the servers and can help to reduce the total cost of operations for these servers.

BRIEF DESCRIPTION OF THE DRAWINGS

FIG. 2 illustrates a method for delta processing according to an embodiment.

FIG. 3A illustrates an example initial result data set according to an embodiment.

FIG. 3B illustrates modifying the initial result data set according to an embodiment.

DETAILED DESCRIPTION

Described herein are techniques for performing delta processing. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Figure 1:
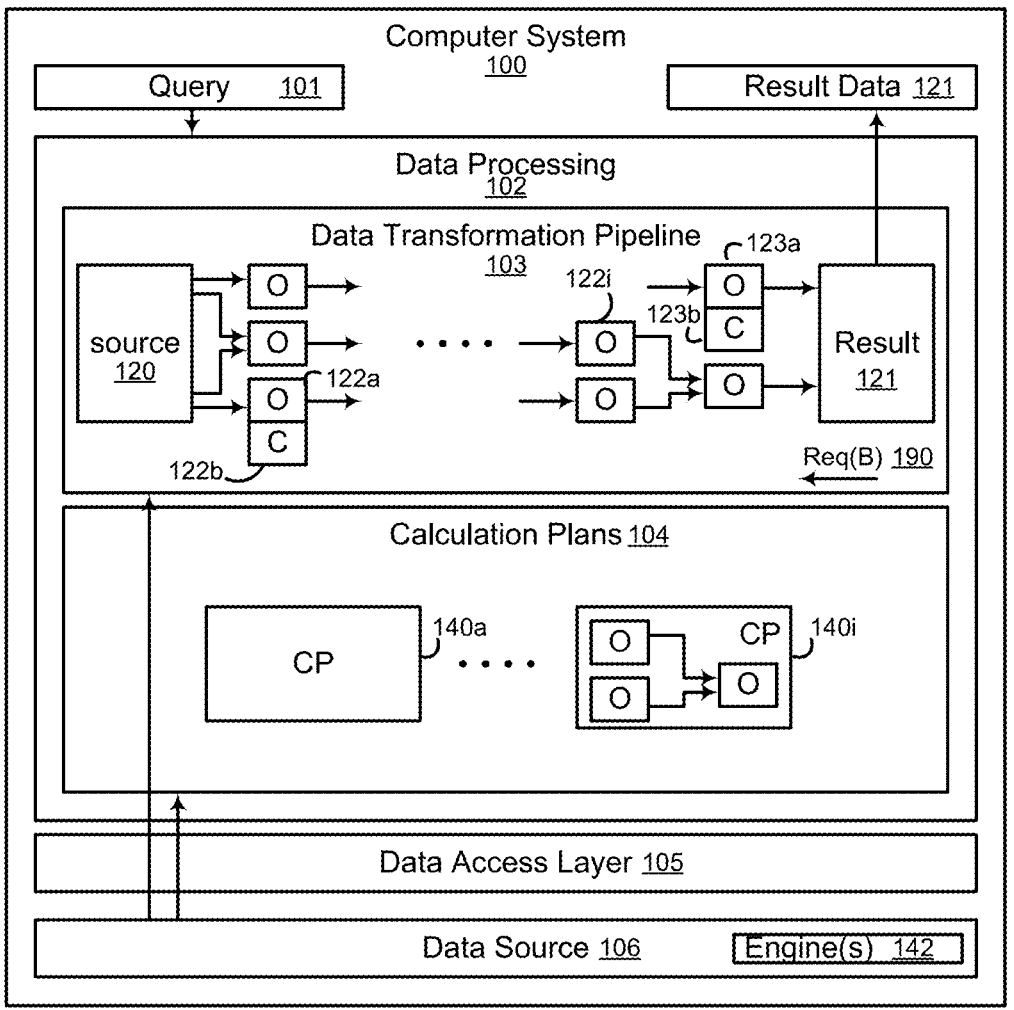
FIG. 1 illustrates a system for delta processing according to an embodiment.

FIG. 1 illustrates a system for delta processing according to an embodiment. A computer system 100 may include one or more backend server computers each comprising one or more processors and memory. The servers may be configured to execute a backend software system including a data storage and analysis system. Computer system 100 includes a data source 106, such as a database, data warehouse, or other form of data repository. For example, in some embodiments the data source may be a data cube. Data in the data source is accessed using a data access layer 105, such as a database management system or other interface layer for retrieving data for processing, for example. A data processing layer 102 includes data transformation pipeline 103. Data transformation pipeline 103 comprises a plurality of linked operations (e.g., transformation 122$i$) configured to specify transformation of the source data 120 to produce result data 121. Result data 121 may be sent to a user on a client system and/or stored in the data source 106, for example. Data is retrieved when a query 101 is received. A query is code for retrieving source data stored in the data repository. A query may specify operations to be performed on the source data to produce the result data, for example.

When a query 101 is received, a particular data transformation pipeline 103 is generated based on the query, to produce the results specified in the query. Transforming the data may require certain calculation entities that define what needs to be calculated semantically. The data transformation pipeline 103 is generated based on the various data manipulations required to meet the query, which may be based on certain calculation entities, for example. Calculation entities are constructs that contain a definition of what should be calculated for the group of cells (e.g., that have the same account and measure). The data transformation pipeline comprises a plurality of operations (such as operation 122$i$) to produce result data as specified in query 101. Data flows downstream from source 120, which may represent one or more actual data sources, through a configuration of operations, to the result 121. The operations may be linked, for example, such that outputs of one operation are linked to inputs of another operation to form the pipeline. Operations in a plan are generated to calculate values according to a definition of one or multiple calculation entities. Some operations, such as operations 122$a$ and 123$a$, may have local operation caches for storing results of the operation, such as cache 122$b$ corresponding to operation 122$a$ and cache 123$b$ corresponding to operation 123$a$, for example. As illustrated below, features and advantages of some embodiments may include checking caches in the pipeline for data and using data generated on previous pipeline executions to produce result data so the whole pipeline does not need to be executed again, for example.

Further, the calculation entities and operations may be used to generate one or more calculation plans 104. Thus, for some operations of a pipeline, one or more calculation plans 104 may be generated. Calculations plans 104 may implement one or more operations specified in the data transformation pipeline, such as calculation plan 140$i$, which implements three (3) operations of the data transformation pipeline 103, for example. Conversely, multiple calculation plans may implement one operation in some embodiments. A pipeline may contain a full definition of how the results are to be calculated semantically, for example, whereas the calculation plan is a specialization of a subset of the pipeline's operations for execution in another data processing software engine 142 running on a separate thread, which may be lower level functionality of the underlying database, for example. Accordingly, when executed, a portion of the source data is processed using the data transformation pipeline and the one or more calculation plans to produce the result data 121. Similar to operations, calculation plans may include cached data (not shown), for example.

Features and advantages of the present disclosure allow modification of a data element of the result data and regeneration of the result data without executing the full data transformation pipeline and/or full calculation plan, thereby saving significant computational time and power. First, when a data element is modified and the system is rerun, for example, the system determines a subset of the operations required to produce the modified data element (and potentially other data elements in a result set as illustrated in an example below). The system may further determine which operations were not required to produce the modified data element. The system may then generate one or more reduced calculation plans, for example, corresponding to one or more operations required to produce the modified data element (e.g., operations and corresponding calculation plan steps not required to produce the modified data may not be re-executed). The reduced calculation plan(s), including less than all the operations, for example, may be executed to produce the result data comprising the modified data element.

Features and advantages of some embodiments may include determining, prior to executing the reduced execution plan, a subset of the operations that have stored partial results in corresponding operation caches. Some of the operations storing partial results in a cache may need to recalculated based on the change in the result data. However, other operations that have available partial results may be reused so the full pipeline does not need to be re-executed. For example, if the modified result data is not directly or indirectly dependent on an operation, then the operation's cached partial results may be reusable because they don't impact the modified result.

In one embodiment, determining operations that may/may not reuse cached data includes generating a request 190. The request 190 may be sent upstream through the pipeline, for example, from each terminal output operation to successive operations back to the source. In some embodiments, the request may include a Boolean value used to determine if a particular operation is to perform a recalculation. For instance, the Boolean value may have an initial value of true at the end of the pipeline (e.g., where the request begins back propagating between operations). If a particular operation receives the Boolean value (from downstream) with a value set to true, then the operation may check to see if a cached partial result is available. The system may further check to determine if the cached partial results are usable (e.g., if the modified result is not dependent on the operation). If an operation supports caching, has a valid cache entry, and it does not affect the modified result data cell (e.g., the modified data element is not dependent on the operation), then the Boolean value is set to false and it is sent to the inputs of the operation and to the next upstream operation(s) in the data flow. If the operation does not have a cache or the data in the cache is not usable (e.g., if the modified result is dependent on the operation or if no cache exists), then the Boolean value is set to (or remains) true and it is sent to the inputs of the operation and to the next upstream operation(s) in the data flow.

FIG. 2 illustrates a method for delta processing according to an embodiment. The following process may be carried out on one or more backend server computer systems, for example. At 201, a query is received to retrieve source data stored in a repository. At 202, a data transformation pipeline is generated based on the query. The data transformation pipeline comprises a plurality of operations configured to specify transformation of the source data to produce result data. At 203, based on the data transformation pipeline, one or more calculation plans is generated to execute a first subset of the plurality of operations. The calculation plans may be executable on data processing software engines to transform the source data according to the first subset of the plurality of operations of the data transformation pipeline. At 204, the source data is processed using the data transformation pipeline and the calculation plans to produce the result data. At 205, a data element of the result data is modified. At 206, the system determines operations required to produce the modified data element. At 207, a reduced calculation plan is generated. The reduced calculation plan comprises at least a portion of the operations required to produce the data element. At 208, the reduced calculation plan is executed to produce the result data comprising the modified data element.

EXAMPLE

In this example, a data model used for illustration is naturally simplified and reduced to elements sufficient to show the benefits of delta processing. The model allows budget planning guided by (predicted) income. The income is calculated as a product of quantity of sold items times the price. The budget is stored directly in a base measure. The model consists of three base measures, that store the source data, and some calculated measures, as well as dimensions Date, Department and Version. The base measures are:

PriceBase: Stores the prices. It is not used directly, but only via the calculated measure Price.

Quantity: Stores the number of entities sold/predicted to be sold.

Budget: The budget assigned to the department. These values are supposed to be changed by the planner.

The calculated measures on top are Price and Income. First, Price is determined from LOOKUP([PriceBase], [d/Department]="#", [d/Department]). This calculated measure will pick the value of PriceBase of the member ID ("#") of the dimension Department, no matter what member the Department dimension has on the axes or in the global filters. The intention is to prevent different departments from having different prices. The prices are all stored in one member and not for each department separately. Second, Income is determined as [Quantity]*[Price] with an exception aggregation SUM along the Date dimension. This result is intended as reference for the budget planner. The exception aggregation means that the aggregation along the Date dimension is performed after the formula is calculated.

A planner may start by opening a story that contains a table using the model described above. To show the values of the table an initial query will be sent. This query and its results will serve as reference for the data entry that follows. FIG. 3A illustrates an example initial result data set according to an embodiment. The planner may enter a new value into a cell 301 as illustrated in FIG. 3B. When this happens, another query is sent to the server, that contains all of the previous query's definition plus the new value for the changed cell. The second query may take the filters and members on the axes from the last query to get a full description of all facts that have been aggregated into the changed cell. These facts may be changed to get the desired value. For example, here a Q4 budget has been changed from 8.9 million to 10 million. Since the Q4 budget value is an aggregation of budgets for October, November, and December, the source data values for each of these months and the total 2024 Budget value are modified when the result data element (Q4 Budget) is modified. As mentioned above, the initial values may be used as weights to distribute the new values. Or, in other words, the algorithm determines a factor for each changed cell and multiplies the source data values (aka, facts) contributing to that cell by the factor so that the source data values maintain an approximately consistent distribution of values. Thus, the relative proportions of the changed source data values may remain the same apart from deviations due to rounding and distribution. After the changes have been applied to the source data, the query is calculated again to get the updated results (e.g., Q4 Budget=10 million). In this example, the new values for [Oct, Nov, Dec]=[3.71, 3.48, and 2.81] and 2024=37 million.

Figure 3C:
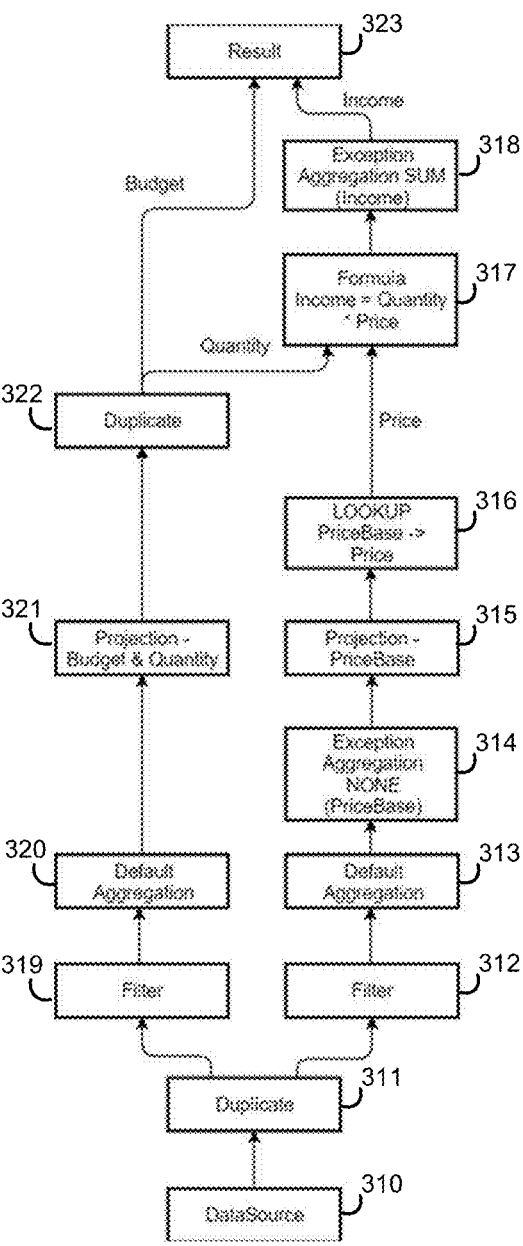
FIG. 3C illustrates an example data transformation pipeline according to an embodiment.

FIG. 3C illustrates an example data transformation pipeline according to an embodiment. For calculating the results of a query, a pipeline is built. Each operation of the pipeline represents a calculation step. Data may be passed from operation to operation via links represented by the lines. The data pipeline may start with a data source 310 followed by a duplicate operation 311, which creates two downstream flows. The first downstream flow includes filter 319, aggregation 320, projection 321, and a duplicate operation 322. The second downstream flow includes filter 312, aggregation 313, exception aggregation 314, projection 315, LOOKUP 316, formula operation 317, which also receives an input from the duplicate operation 322, and an exception aggregation operation 318. The processing of Budget and Quantity is combined in the lower part of the pipeline for better performance. In this example, a data source represents the stored data to be retrieved and processed into result data. First, a duplicate operation 311 is performed to create two streams of processing. Both streams are then filtered. Budget and Quantity data values are generated from an aggregation and projection. Price data values are generated along the second stream with an aggregation, exception aggregation, projection, and LOOKUP operations. A duplicate operation allows Quantity data and Price data to be received and processed by a formula operation (e.g., a regular expression: Income=Quantity*Price). The result data set 323 is the data associated with the Budget and Income.

Figures 3D, 3E:
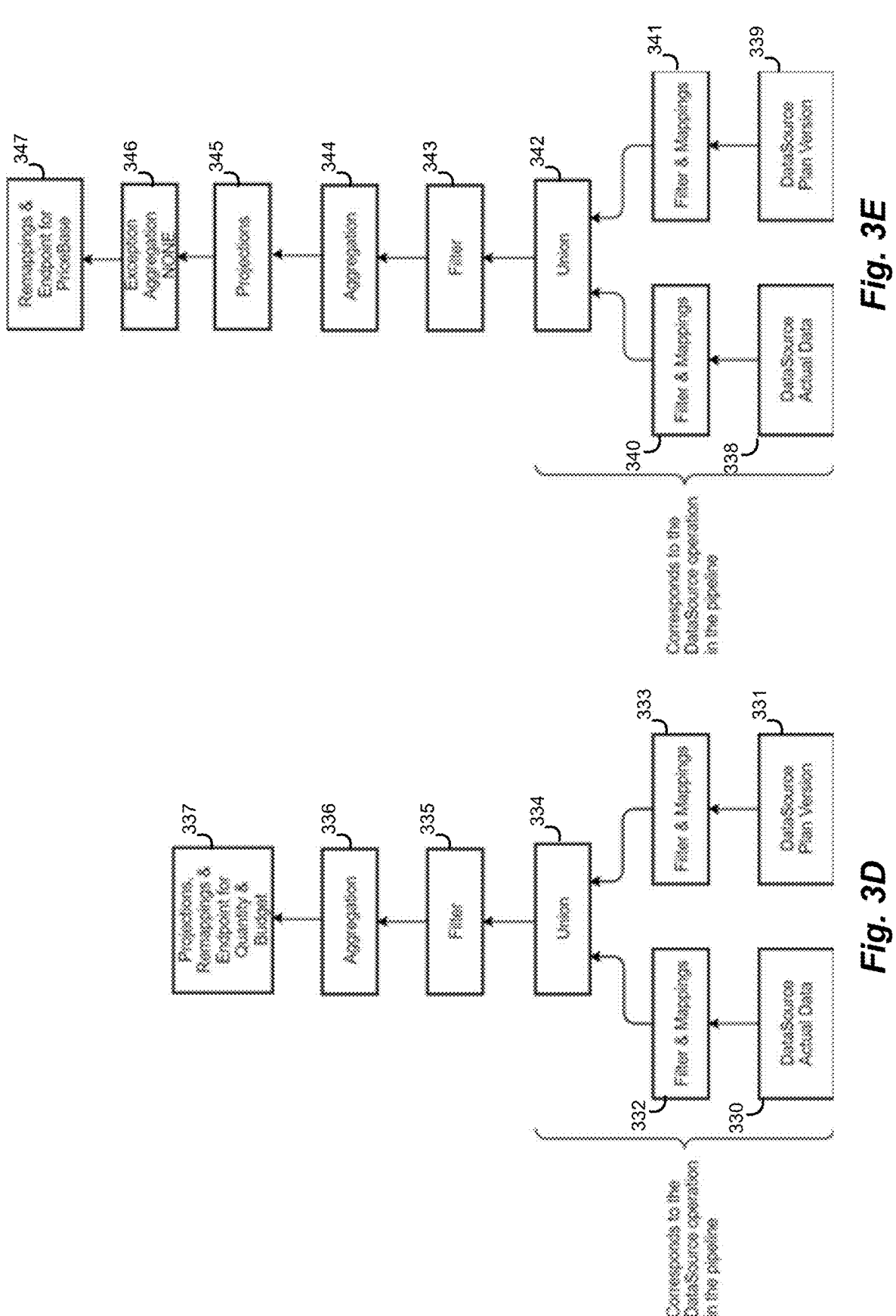
FIG. 3D illustrates an aspect of an example calculation plan according to an embodiment.
FIG. 3E illustrates another aspect of an example calculation plan according to an embodiment.

FIGS. 3D and 3E illustrate an example calculation plan according to an embodiment. The two flows shown in FIGS. 3D and 3E may be combined into a single calculation plan in some embodiments. A part of the data pipeline may be delegated to another engine on another thread, for example. For this engine, a calculation plan is generated that implements the portions from the data source up to the projections. These calculation plans are more detailed and contains more operations. One difference is that the Data Source operation of the pipeline is represented by a union of multiple actual data sources. Each of these data sources may correspond to a different version of the source data set (e.g., a private version and a public version). For example, different versions may have unique IDs so they can be used as members of a version dimension for comparison in the result set. The flow in FIG. 3D includes two data sources 330 and 331 coupled to filter & mapping function 332 and 333, respectively. The outputs are fed into a union function 334, which is coupled downstream to filter 335, aggregation 336, and projection 337 (corresponding to operations 319-321 in FIG. 3C, but implemented in the engine). Similarly, the flow in FIG. 3E includes two data sources 338 and 339 coupled to filter & mapping function 340 and 341, respectively. The outputs are fed into a union function 342, which is coupled downstream to filter 343, aggregation 344, projection 345, exception aggregation 346 (corresponding to operations in the second stream in FIG. 3C, but implemented in the engine), and remapping & endpoint 347.

Execution of the data transformation processing starts with the processing of the calculation plan by one or more data processing software engine(s). Data processing engines fetch the data from the multiple versions, filter them, create the union over the multiple versions and perform the base aggregation. These may be aggregations of dimensions that are not on any axis as well as aggregation along the hierarchies (e.g. from months to quarters to years). In the case of the PriceBase measure, the plan also executes the exception aggregation NONE. This exception aggregation means that parent nodes have the same value as the children if they all have the same value and no value otherwise. The following tables show result data from the pipeline and calculation plans:

TABLE 1

| Date | Department | Version | Budget | Quantity |
|------|-----------|---------|--------|----------|
| 2024 | DepartmentA | Plan | 35,900,000 | 55,600 |
| Q1 | DepartmentA | Plan | 9,000,000 | 13,800 |
| Q2 | DepartmentA | Plan | 9,000,000 | 13,800 |
| Q3 | DepartmentA | Plan | 9,000,000 | 13,900 |
| Q4 | DepartmentA | Plan | 8,900,000 | 14,100 |
| October | DepartmentA | Plan | 3,300,000 | 4,700 |
| November | DepartmentA | Plan | 3,100,000 | 4,600 |
| December | DepartmentA | Plan | 2,500,000 | 4,800 |
| 2024 | DepartmentB | Plan | 12,700,000 | 23,530 |
| Q1 | DepartmentB | Plan | 3,000,000 | 5,790 |
| Q2 | DepartmentB | Plan | 3,000,000 | 5,890 |
| Q3 | DepartmentB | Plan | 3,000,000 | 5,650 |
| Q4 | DepartmentB | Plan | 3,700,000 | 6,200 |
| October | DepartmentB | Plan | 1,200,000 | 2,000 |
| November | DepartmentB | Plan | 1,400,000 | 2,000 |
| December | DepartmentB | Plan | 1,100,000 | 2,200 |

For PriceBase, the calculation plan result may not contain the Department dimension, for example, because the LOOKUP formula may provided the same result for every member of the Department dimension. Some hierarchy members (2024 and Q4) do not have a value, because their children do not have the same value.

TABLE 2

| Date | Version | PriceBase |
|------|---------|-----------|
| 2024 | Plan | * |
| Q1 | Plan | 1,000 |
| Q2 | Plan | 1,000 |
| Q3 | Plan | 1,000 |
| Q4 | Plan | * |
| October | Plan | 1,000 |
| November | Plan | 1,100 |
| December | Plan | 1,100 |

The further processing may be done by the pipeline itself. Here, the LOOKUP, Duplicate, and Formula steps may be performed by the pipeline. For example, LOOKUP PriceBase→Price: This operation will create references from the result of PriceBase into a higher dimensional cube, that also includes the Department dimension. For each row this will result into two references, one for DepartmentA and one for DepartmentB. This operation could be very expensive if there many Departments. Additionally, the measure will be mapped to its target name Price. The Duplicate operation does not really process any data. It is there for consistency reasons and will only pass on references to the data. The Formula operation will calculate the product of Quantity and Price for each row. Where Price has no valid value also Income will have no valid value. The following table is an example output data set from the Formula operation:

TABLE 3

| Date | Department | Version | Quantity | Price | Income |
|------|-----------|---------|----------|-------|--------|
| 2024 | DepartmentA | Plan | 55,600 | * | * |
| Q1 | DepartmentA | Plan | 13,800 | 1,000 | 13,800,000 |
| Q2 | DepartmentA | Plan | 13,800 | 1,000 | 13,800,000 |
| Q3 | DepartmentA | Plan | 13,900 | 1,000 | 13,800,000 |
| Q4 | DepartmentA | Plan | 14,100 | * | * |
| October | DepartmentA | Plan | 4,700 | 1,000 | 4,700,000 |
| November | DepartmentA | Plan | 4,600 | 1,100 | 5,060,000 |
| December | DepartmentA | Plan | 4,800 | 1,100 | 5,280,000 |
| 2024 | DepartmentB | Plan | 23,530 | * | * |
| Q1 | DepartmentB | Plan | 5,790 | 1,000 | 5,790,000 |
| Q2 | DepartmentB | Plan | 5,890 | 1,000 | 5,890,000 |
| Q3 | DepartmentB | Plan | 5,650 | 1,000 | 5,650,000 |
| Q4 | DepartmentB | Plan | 6,200 | * | * |
| October | DepartmentB | Plan | 2,000 | 1,000 | 2,000,000 |
| November | DepartmentB | Plan | 2,000 | 1,100 | 2,200,000 |
| December | DepartmentB | Plan | 2,200 | 1,100 | 2,420,000 |

The Exception Aggregation operation on Income in the pipeline then aggregates the value of Income from the leaves up to the hierarchy nodes filling the invalid values with proper values. The following Table 4 is the result data set for Income:

TABLE 4

| Date | Department | Version | Income |
|------|-----------|---------|--------|
| 2024 | DepartmentA | Plan | 56,540,000 |
| Q1 | DepartmentA | Plan | 13,800,000 |
| Q2 | DepartmentA | Plan | 13,800,000 |
| Q3 | DepartmentA | Plan | 13,800,000 |
| Q4 | DepartmentA | Plan | 15,040,000 |
| October | DepartmentA | Plan | 4,700,000 |
| November | DepartmentA | Plan | 5,060,000 |
| December | DepartmentA | Plan | 5,280,000 |
| 2024 | DepartmentB | Plan | 23,950,000 |
| Q1 | DepartmentB | Plan | 5,790,000 |
| Q2 | DepartmentB | Plan | 5,890,000 |
| Q3 | DepartmentB | Plan | 5,650,000 |
| Q4 | DepartmentB | Plan | 6,620,000 |
| October | DepartmentB | Plan | 2,000,000 |
| November | DepartmentB | Plan | 2,200,000 |
| December | DepartmentB | Plan | 2,420,000 |

The result for Income and Budget are then rendered into the result data output.

As mentioned above, features and advantages of the present disclosure include the ability to change a value of a result data element (e.g., a result cell), and the change is propagated upstream. Rather than regenerate a whole data flow calculation for generating a new data set consistent with the modified result data element, embodiments of the present disclosure determine which operations are/are not impacted by the change and reuse existing data (e.g., from an operation's local cache) to regenerate the result without re-executing the entire data flow.

For example, the change of a value of the cell will be sent to the server as an identical query except for an additional entry for the new value. All facts aggregated into the changed cell are adapted such that a recalculation of all the above steps will result in the desired result value. In our example the data entry changes value of the cell (Q4, DepartmentA, Plan, Budget) to 10,000,000. This results in changes in the source data as shown in the following Table 5, where the change is distributed across the original values by using each original value as a weight:

TABLE 5

| Date | Department | Version | Budget |
|------|-----------|---------|--------|
| October | DepartmentA | Plan | 3,707,865.1685394 |
| November | DepartmentA | Plan | 3,483,146.0674157 |
| December | DepartmentA | Plan | 2,808,988.7640449 |

Without delta processing the full calculation plan and the full pipeline are typically processed again after a modification to the result data elements, with the same steps as in the initial processing as described above to recalculate the new results. This is inefficient, since only a small part of the data has changed, and the rest could be kept from the previous results.

Figure 3F:
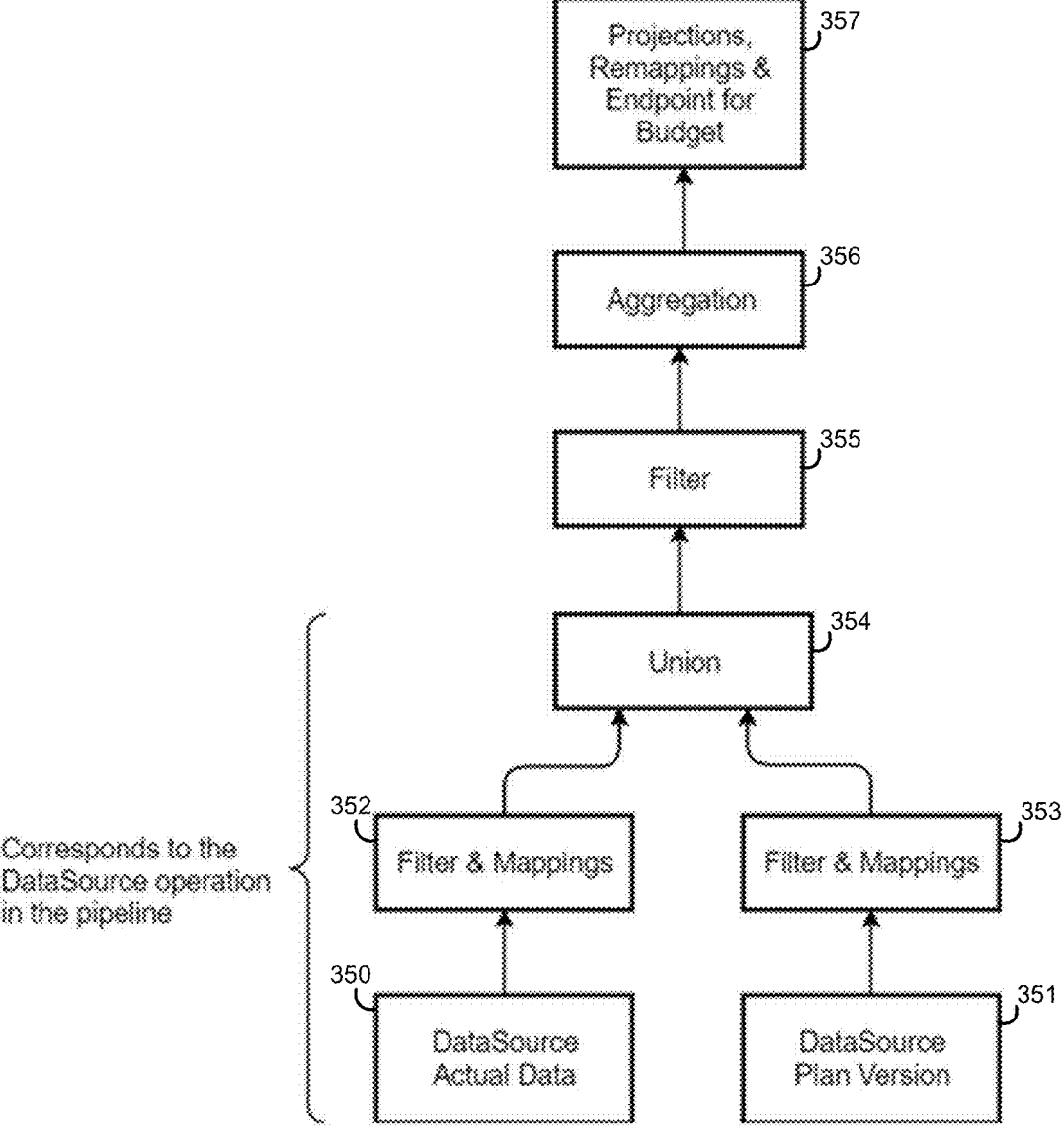
FIG. 3F illustrates an example reduced calculation plan according to an embodiment.

FIG. 3F illustrates an example reduced calculation plan according to an embodiment. Features and advantages of the present disclosure include generating one or more reduced calculation plans. For example, the calculation plans may be reduced to include only the changed calculation entities/measures (e.g., portions of the calculation plan entities required to generate the modified result data element(s)). Additionally, a request may be generated in the pipeline that determines upfront which operations of the pipeline can load their results from a cache and which need to recalculate, for example. The request propagates from the end of the pipeline to the beginning of the pipeline through the pipeline operations. The calculation plans are regenerated, but this time the calculation plans omit operations that are only needed for calculation entities/measures that have not changed. Thus, the calculations plans have been reduced.

The processing and the caching in the initial query may further cache the results of the calculation plan. The list of changed calculation entities may be determined by taking the originally changed calculation entities and calculation entities depending on them directly or indirectly. In the re-execution after the cell changes were processed there are the first difference is in the execution of a reduced calculation plan. The list of Calculation Entities that need to be recalculated is firstly limited to the Calculation Entities calculated in the Calculation Plan. In our example this is again the measure Budget. In this example, all its dependencies are then added because these are needed for the Calculation Plan. In the example there are no additional measures. Then the reduced Calculation Plan is generated which will contain only the operations needed to calculate the changed Calculation Entities, here Budget. By reducing the calculation plan, the modified result data set can be produced with less computations. The modified result data is shown in the following Table 6:

TABLE 6

| Date | Department | Version | Budget |
|------|-----------|---------|--------|
| 2024 | DepartmentA | Plan | 37,000,000 |
| Q1 | DepartmentA | Plan | 9,000,000 |
| Q2 | DepartmentA | Plan | 9,000,000 |
| Q3 | DepartmentA | Plan | 9,000,000 |
| Q4 | DepartmentA | Plan | 10,000,000 |
| October | DepartmentA | Plan | 3,707,865.1685394 |
| November | DepartmentA | Plan | 3,483,146.0674157 |
| December | DepartmentA | Plan | 2,808,988.7640449 |
| 2024 | DepartmentB | Plan | 12,700,000 |
| Q1 | DepartmentB | Plan | 3,000,000 |

TABLE 6-continued

| Date | Department | Version | Budget |
| --- | --- | --- | --- |
| Q2 | DepartmentB | Plan | 3,000,000 |
| Q3 | DepartmentB | Plan | 3,000,000 |
| Q4 | DepartmentB | Plan | 3,700,000 |
| October | DepartmentB | Plan | 1,200,000 |
| November | DepartmentB | Plan | 1,400,000 |
| December | DepartmentB | Plan | 1,100,000 |

These results are combined with the cached results during the insertion into the cube data structure, that is used for the further processing of the pipeline. When the cached results are inserted, cells that belong to changed CalculationEntities are omitted. When the new results are inserted, only cells that belong to changed CalculationEntities are inserted. As a result the data will contain the values as if the full Calculation Plan had been calculated.

Before the pipeline execution continues a request is sent from the result operation through the pipeline that loads the data from the cache, where it is possible. The request carries a Boolean whether calculation results are still needed. It starts with the value true. For the further operations the request will do the following steps:

If the request's Boolean still says that recalculation is needed:

If the operation supports caching and it does not belong to a changed Calculation Entity (or its dependees) it will try to load its results from cache.

If that succeeds the request will be pushed to the inputs with the Boolean set to false, because the input data is not needed, anymore, and the operation will be marked as processed, because it already has its results.

If loading from cache failed, the operation will be marked as requiring recalculation and the request will be sent on with the Boolean on true (input values are still needed).

If the operation does not support caching, it will be marked as requiring recalculation and the request will be passed on.

If the request's Boolean says that no recalculation is needed, the operation will be marked as not needed.

It can happen, that the request reaches an operation a second time, e.g., when multiple formulas have the same operand. In that case the state of the operation might need to be updated. For example, if the operation is already marked as processed because a cache load succeeded, or as requiring recalculation, no change is needed and the request does not need to progress any further because the inputs have been updated accordingly from the first visit. If the operation has been marked as not needed, it will be updated according to the above rules if the request's Boolean says, that the calculation results are needed. Then the request is sent on to the inputs.

In our example the operation Exception Aggregation will have its cached values loaded and be marked as processed. The operations Formula for Income as well as the LOOKUP operation will be marked as not needed. Their values have not changed and they do not depend on Budget, which is the only measure that has been changed. For Budget there are no operations beyond the ones calculated in the Calculation Plan. The operations that are handled in the Calculation Plan don't need to be handled by the request, because they are handled differently, anyway.

As a result the pipeline processing will be simplified to the following: The operations LOOKUP for Price and Formula for Income will be skipped, because they are marked as not needed. The operation Exception Aggregation for Income will also be skipped, because it is marked as already processed. The results for Budget have already been calculated in the reduced Calculation Plan.

Figure 4:
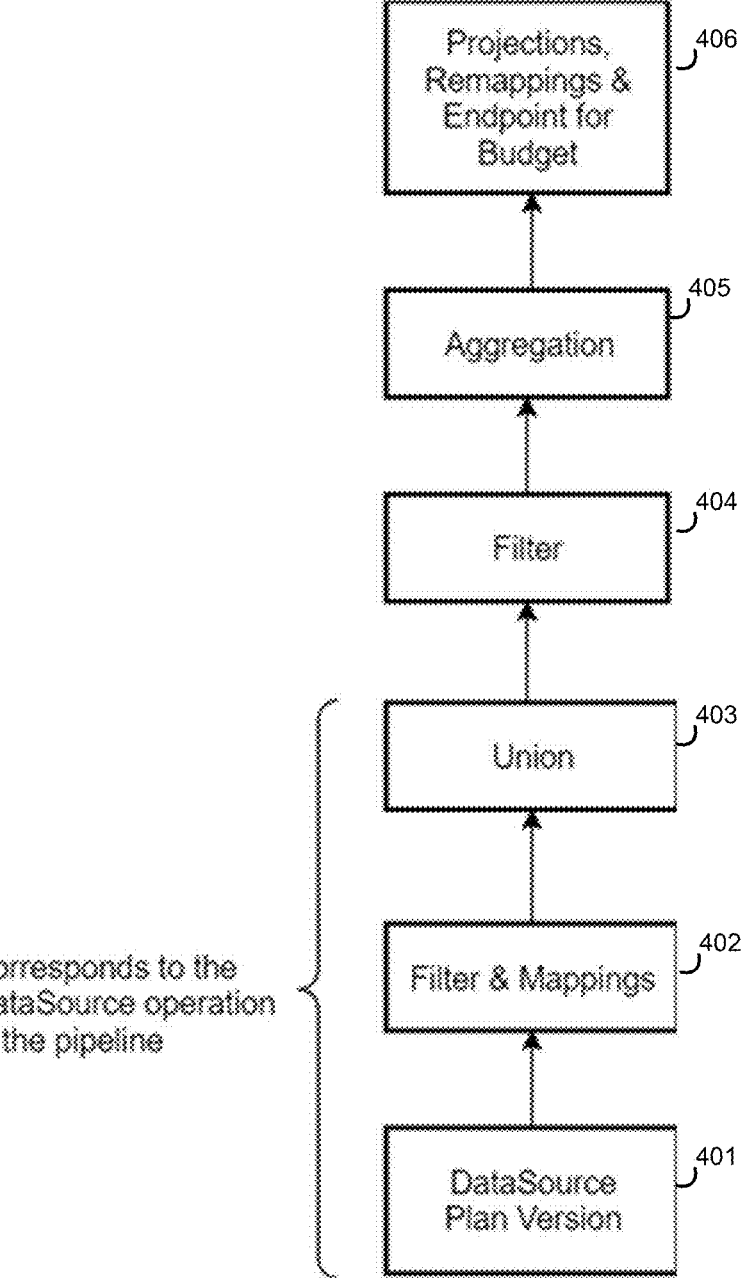
FIG. 4 illustrates another example reduced calculation plan according to an embodiment.

FIG. 4 illustrates another example reduced calculation plan according to an embodiment. In this example, the reduced calculation plan is reduced even further. For that purpose, the system may not only remember the changed Calculation Entities from the cell changes, but also the changed versions. Then all versions that have not been changed are removed from the Calculation Plan.

In our example this will not make a difference for the results, because the other versions were already filtered out. But with this change they are also removed from the Calculation Plan, which gives another significant performance boost.

During insertion of the results of the Calculation Plan into the later data structures we need to distinguish the values not only by Calculation Entity but also by version.

In one embodiment, another request marks the operations that have changed values. The request progresses according to the following rules. In some embodiments, this done outside the pipeline using heuristics and dependency analysis on the Calculation Entities. Using a request in the pipeline may be more robust. In one example, the request would need to behave as following:

It starts at the data source with a list of measures/accounts that have changed.

Some operations reduce the measures/accounts that are passed on. On these operations it needs to intersect its changed measures/account with the ones still handled by this operation.

Other operations such as formulas propagate a change from one measure/account to another. Then the list of changed accounts/measures needs to be updated.

Every operation that the request reaches with an empty list of changed accounts/measures can be marked as unchanged, every other operation as changed.

In the above example the operations LOOKUP, Formula, and Exception Aggregation would be marked as unchanged.

In some embodiments, the operations handled by the Calculation Plan may need to be marked.

Figure 5:
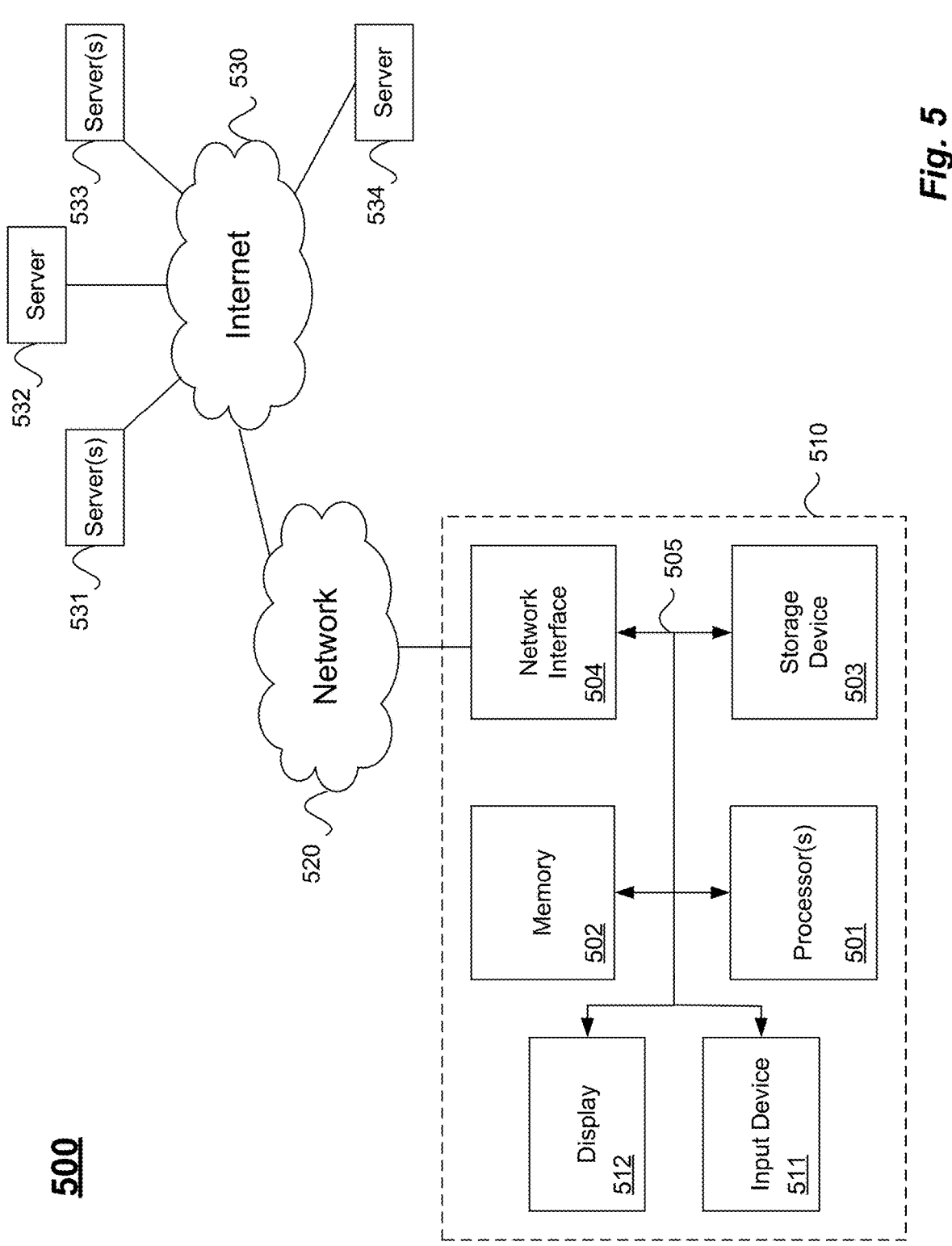
FIG. 5 illustrates hardware of a special purpose computing system configured according to the above disclosure.

FIG. 5 illustrates hardware of a special purpose computing system 500 configured according to the above disclosure. The following hardware description is merely one example. It is to be understood that a variety of computers topologies may be used to implement the above-described techniques. An example computer system 510 is illustrated in FIG. 5. Computer system 510 includes a bus 505 or other communication mechanism for communicating information, and one or more processor(s) 501 coupled with bus 505 for processing information. Computer system 510 also includes memory 502 coupled to bus 505 for storing information and instructions to be executed by processor 501, including information and instructions for performing some of the techniques described above, for example. Memory 502 may also be used for storing programs executed by processor(s) 501. Possible implementations of memory 502 may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, solid state disk, a flash or other non-volatile memory, a USB memory card, or any other electronic storage medium from which a computer can read. Storage device 503 may include source code, binary code, or software files for performing the techniques above, for example. Storage device 503 and memory 502 are both examples of non-transitory computer readable storage mediums (aka, storage media).

In some systems, computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses for coupling various components of the computer together, for example.

Computer system 510 also includes a network interface 504 coupled with bus 505. Network interface 504 may provide two-way data communication between computer system 510 and a local network 520. Network 520 may represent one or multiple networking technologies, such as Ethernet, local wireless networks (e.g., WiFi), or cellular networks, for example. The network interface 504 may be a wireless or wired connection, for example. Computer system 510 can send and receive information through the network interface 504 across a wired or wireless local area network, an Intranet, or a cellular network to the Internet 530, for example. In some embodiments, a frontend (e.g., a browser), for example, may access data and features on backend software systems that may reside on multiple different hardware servers on-prem 531 or across the network 530 (e.g., an Extranet or the Internet) on servers 532-534. One or more of servers 532-534 may also reside in a cloud computing environment, for example.

FURTHER EXAMPLES

Each of the following non-limiting features in the following examples may stand on its own or may be combined in various permutations or combinations with one or more of the other features in the examples below. In various embodiments, the present disclosure may be implemented as a system, method, or computer readable medium.

Embodiments of the present disclosure may include systems, methods, or computer readable media. In one embodiment, the present disclosure includes computer system comprising: at least one processor and at least one non-transitory computer readable medium (e.g., memory) storing computer executable instructions that, when executed by the at least one processor, cause the computer system to perform methods as described herein and in the following examples. In another embodiment, the present disclosure includes a non-transitory computer-readable medium storing computer-executable instructions that, when executed by at least one processor, perform the methods as described herein and in the following examples.

In one embodiment, the present disclosure includes a method comprising: on one or more backend server computer systems, receiving a query to retrieve source data stored in a repository; generating, based on the query, a data transformation pipeline, the data transformation pipeline comprising a plurality of operations configured to specify transformation of the source data to produce result data; generating, based on the data transformation pipeline, one or more calculation plans to execute a first subset of the plurality of operations, the one or more calculation plans executable on one or more data processing software engines to transform the source data according to the first subset of the plurality of operations of the data transformation pipeline; processing the source data using the data transformation pipeline and the one or more calculation plans to produce the result data; modifying a data element of the result data; determining a second subset of the plurality of operations required to produce the modified data element; generating at least one reduced calculation plan comprising at least a portion of the second subset of the plurality of operations required to produce the data element; and executing the at least one reduced calculation plan to produce the result data comprising the modified data element.

In one embodiment, one or more of the plurality of operations store partial results in one or more corresponding operation caches.

In one embodiment, the method further comprising: generating a request comprising at least one Boolean value; sending the request to upstream through to the data transformation pipeline; and when the Boolean value is true, loading data from one or more operation caches of one or more corresponding operations not affecting the modified data element, and when the Boolean value is false, not loading data from one or more operation caches of one or more corresponding operations.

In one embodiment, the Boolean value has an initial value of true.

In one embodiment, the method further comprising, when the Boolean value is true, when said loading data from one or more operation caches of one or more corresponding operations not affecting the modified data element is successful, setting the Boolean value to false and sending the request to a next operation upstream.

In one embodiment, the method further comprising modifying one or more source data elements to produce the modified data element of the result data.

In one embodiment, original values of the one or more source data elements are used as weights to the one or more source data elements to produce the modified data element.

In one embodiment, the repository comprises a data cube.

In one embodiment, the data processing software engines are external to the one or more backend server computer systems.

In one embodiment, the operations are linked.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   on one or more backend server computer systems,
      receiving a query to retrieve source data stored in a repository;
      generating, based on the query, a data transformation pipeline, the data transformation pipeline comprising a plurality of operations configured to specify transformation of the source data to produce result data;
      generating, based on the data transformation pipeline, one or more calculation plans to execute a first subset of the plurality of operations, the one or more calculation plans executable on one or more data processing software engines to transform the source data according to the first subset of the plurality of operations of the data transformation pipeline;

processing the source data using the data transformation pipeline and the one or more calculation plans to produce the result data;

modifying a data element of the result data;

generating at least one reduced calculation plan comprising at least a portion of a second subset of the plurality of operations required to produce the modified data element in the result data; and executing the at least one reduced calculation plan to regenerate the result data comprising the modified data element.

2. The method of claim 1, wherein one or more of the plurality of operations store partial results in one or more corresponding operation caches.

3. The method of claim 2, further comprising:

generating a request comprising at least one Boolean value;

sending the request to upstream through to the data transformation pipeline; and when the Boolean value is true, loading data from one or more operation caches of one or more corresponding operations not affecting the modified data element, and when the Boolean value is false, not loading data from one or more operation caches of one or more corresponding operations.

4. The method of claim 3, wherein the Boolean value has an initial value of true.

5. The method of claim 3, further comprising, when the Boolean value is true, when said loading data from one or more operation caches of one or more corresponding operations not affecting the modified data element is successful, setting the Boolean value to false and sending the request to a next operation upstream.

6. The method of claim 1, further comprising modifying one or more source data elements to produce the modified data element of the result data.

7. The method of claim 6, wherein original values of the one or more source data elements are used as weights to the one or more source data elements to produce the modified data element.

8. The method of claim 1, wherein the repository comprises a data cube.

9. The method of claim 1, wherein the data processing software engines are external to the one or more backend server computer systems.

10. The method of claim 1, wherein the operations are linked.

11. A computer system comprising:

at least one processor;

at least one non-transitory computer-readable medium storing computer-executable instructions that, when executed by the at least one processor, cause the computer system to perform a method comprising:

on one or more backend server computer systems, receiving a query to retrieve source data stored in a repository;

generating, based on the query, a data transformation pipeline, the data transformation pipeline comprising a plurality of operations configured to specify transformation of the source data to produce result data;

generating, based on the data transformation pipeline, one or more calculation plans to execute a first subset of the plurality of operations, the one or more calculation plans executable on one or more data processing software engines to transform the source data according to the first subset of the plurality of operations of the data transformation pipeline;

processing the source data using the data transformation pipeline and the one or more calculation plans to produce the result data;

modifying a data element of the result data;

generating at least one reduced calculation plan comprising at least a portion of a second subset of the plurality of operations required to produce the modified data element in the result data; and executing the at least one reduced calculation plan to regenerate the result data comprising the modified data element.

12. The computer system of claim 11, wherein one or more of the plurality of operations store partial results in one or more corresponding operation caches.

13. The computer system of claim 11, wherein the repository comprises a data cube.

14. The computer system of claim 11, wherein the data processing software engines are external to the one or more backend server computer systems.

15. The computer system of claim 11, wherein the operations are linked.

16. A non-transitory computer-readable medium storing computer-executable instructions that, when executed by at least one processor of a computer system, perform a method comprising:

on one or more backend server computer systems, receiving a query to retrieve source data stored in a repository;

generating, based on the query, a data transformation pipeline, the data transformation pipeline comprising a plurality of operations configured to specify transformation of the source data to produce result data;

generating, based on the data transformation pipeline, one or more calculation plans to execute a first subset of the plurality of operations, the one or more calculation plans executable on one or more data processing software engines to transform the source data according to the first subset of the plurality of operations of the data transformation pipeline;

processing the source data using the data transformation pipeline and the one or more calculation plans to produce the result data;

modifying a data element of the result data;

determining a second subset of the plurality of operations required to produce the modified data element;

generating at least one reduced calculation plan comprising at least a portion of a second subset of the plurality of operations required to produce the modified data element in the result data; and executing the at least one reduced calculation plan to regenerate the result data comprising the modified data element.

17. The non-transitory computer-readable medium of claim 16, wherein one or more of the plurality of operations store partial results in one or more corresponding operation caches.

18. The non-transitory computer-readable medium of claim 16, wherein the repository comprises a data cube.

19. The non-transitory computer-readable medium of claim 16, wherein the data processing software engines are external to the one or more backend server computer systems.

20. The non-transitory computer-readable medium of claim 16, wherein the operations are linked.

* * * * *